Nov. 5, 1946.    A. W. UHL    2,410,763
VIBRATION PREVENTING SYPHON TUBE SUPPORT
Filed Oct. 21, 1942
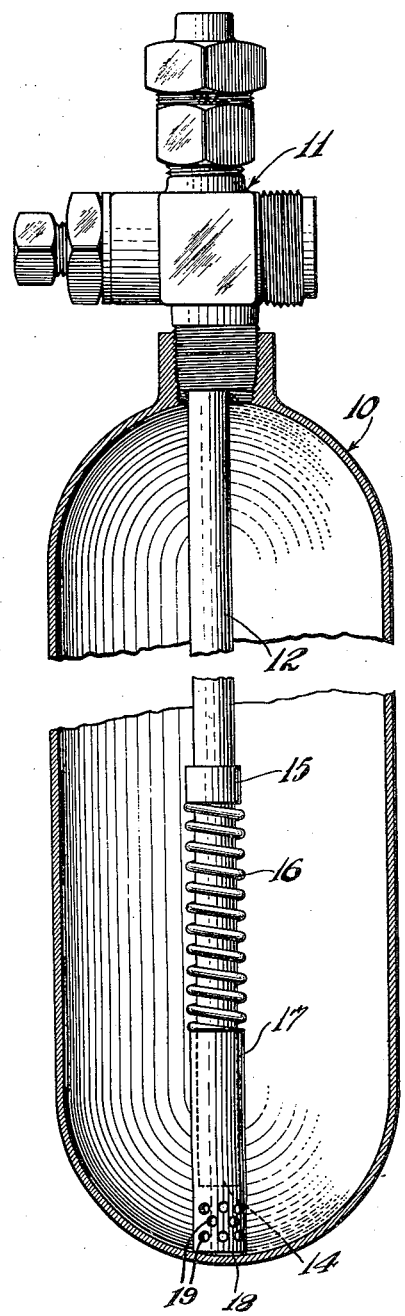
INVENTOR
Arthur W. Uhl
BY J. William Carson
ATTORNEY ered Nov. 5, 1946

UNITED STATES PATENT OFFICE 2,410,763

VIBRATION PREVENTING SYPHON TUBE SUPPORT

Arthur W. Uhl, Inwood, Long Island, N. Y., assignor to Specialties Development Corporation, Bloomfield, N. J., a corporation of New Jersey Application October 21, 1942, Serial No. 462,875

1 Claim. (Cl. 222—464)

This invention relates to supports, and more particularly has reference to supports of a resilient type in connection with tubular members to be supported in containers for high pressure fluid media, which are adapted to absorb and minimize the effects of shock and vibration on the tubular members.

While the shock absorbing arrangement hereinabove referred to is applicable as a general resilient support, it will be described hereinafter in connection with containers for fluid pressure media.

Containers of this type, when in use, particularly for fire extinguishing or inflating purposes, are usually provided with a discharge control device and a syphon tube, generally secured in the control device and extending into the container substantially to or adjacent the bottom thereof. This is the case where the fluid medium is a liquid or is a gas which has been liquefied by compression, as liquid carbon dioxide.

The difficulty with this type of construction has been that the containers, in their various uses, are subject to a great deal of moving about, shocks, vibrations, and similar influences. These disturbances are transmitted through the body of the container causing an oscillation of the syphon tube or tubular member, which, supported only at one end, acts as a cantilever member intermittently loaded at its center of gravity. Frequently, this results in crystallization and subsequent failure of the member adjacent its point of support at the control device.

It is an object of this invention to overcome the foregoing difficulties.

Another object is to provide a support for a tubular member or syphon tube of the type referred to.

Another object is to provide a support which acts as a shock absorber and will act as a damper for oscillatory movements of the supported member.

Another object is to provide a support which is movable with respect to the surface on which it bears.

A further object is to provide a support which is rugged, simple in construction and easily assembled.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description and is shown in the accompanying drawing, forming a part of the specification, wherein the drawing shows a view in elevation of the shock absorber of the present invention as used in a fluid medium container shown in section.

In the drawing, a fluid pressure medium container 10 is shown provided with a valve 11 which may be of any one of the known standard forms used with this type of container. A tubular member or syphon tube 12 is secured into the neck portion or the lower portion of the valve 11 and extends substantially axially through the larger part of the container 10 to a point 14 as shown in broken lines. The tubular member at 15 is formed with a collar against which abuts one end of a spring 16 telescoped about the lower end of the member 12. The other end of the spring 16 bears against the upper end of a sleeve 17 mounted with a sliding fit over the free end of the member 12. The free end of the sleeve 17 rests at 18 on the inside of the container 10 and has fluid flow conducting means in the side thereof such as one or more apertures 19.

It will be apparent that the free end of the tubular member 12 is resiliently supported in contrast to the rigid support of its other end, and the possible cantilever action of the member 12 with the resultant danger of crystallization and failure thereof due to shock or vibration to which the container 10 may be subjected is thus taken up and minimized by the shock absorber arrangement hereinabove described.

The free end of the sleeve 17 has only a frictional engagement with the inside surface of the container 10, and any oscillatory movement of the tubular member 12, therefore tends to move the sleeve relative to the container. As any deviation of the tubular member and the sleeve from the axial position will tend to shorten their overall length as shown in the drawing, a compressive force will be exerted on the free end of the sleeve, resulting in a compression of the spring and a damping and practical suppression of the oscillatory movement of the member 12.

Axial disturbances, as will be apparent, will be opposed and taken up directly by the spring, so that damaging axial loads on the member 12 will be eliminated.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

The combination comprising a container for a fluid medium under pressure, said container having a discharge opening at one end thereof and a closed end wall at an opposite end thereof, a valve having a body portion in said opening, a relatively long tubular member having one end secured to said body portion of said valve and having a free end spaced a relatively short distance from said end wall, a collar secured to the exterior of said tubular member at a point between said ends of said tubular member but nearer said free end and providing an outwardly extending shoulder, a relatively short tubular member slidably mounted on said first tubular member in telescoping relation therewith at said free end and having an end engaging said end wall, said second tubular member having fluid conducting means in the side thereof, and a spring mounted on and coiled around said first tubular member, said spring having one end engaging said shoulder and having its other end engaging the other end of said second tubular member, whereby the first mentioned end of said second tubular member is urged against said end wall to hold said first tubular member against vibration.

ARTHUR W. UHL.